United States Patent [19]

Switzer

[11] 4,399,893
[45] Aug. 23, 1983

[54] LOCKING WHEEL BLOCK

[75] Inventor: Ralph V. Switzer, Lake Forest, Ill.

[73] Assignee: The Aldon Company, Waukegan, Ill.

[21] Appl. No.: 316,083

[22] Filed: Oct. 29, 1981

[51] Int. Cl.³ .............................................. B60T 3/00
[52] U.S. Cl. ........................................ 188/32; 70/14;
         70/226; 410/10; 410/19; 410/30
[58] Field of Search ..................... 188/32, 4 R; 410/3,
         410/4, 9, 10, 19, 30; 70/14, 225, 226, 228

[56] References Cited

U.S. PATENT DOCUMENTS

| | | | |
|---|---|---|---|
| 1,776,935 | 9/1930 | Snyder | 410/30 |
| 2,835,349 | 5/1958 | Veselik et al. | 188/32 |
| 3,024,871 | 3/1962 | Stein | 188/32 |
| 3,113,642 | 12/1963 | Lay | 188/32 |
| 3,605,954 | 9/1971 | Wakabayashi et al. | 188/32 X |
| 4,031,983 | 6/1977 | Lentini | 188/32 |

FOREIGN PATENT DOCUMENTS 675784 11/1929 France ................................. 188/32

*Primary Examiner*—George E. A. Halvosa

[57] ABSTRACT

A wheel block for dual truck wheels having a pair of wheel ramps and a single center locking member adapted to releasably connect the wheel block to the wheel and tire rim of a vehicle so as to prevent movement thereof.

6 Claims, 3 Drawing Figures

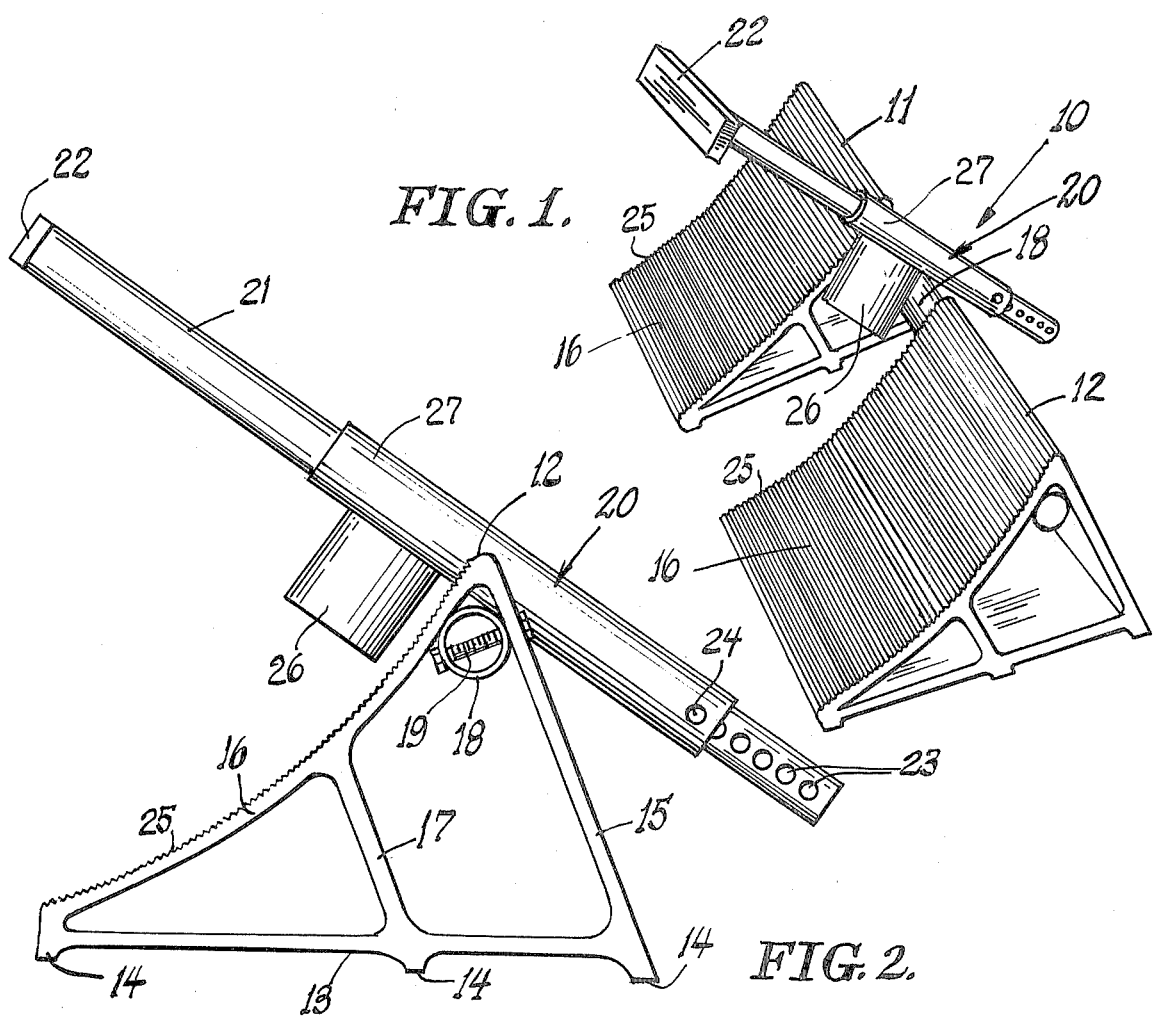
FIG. 1.
FIG. 2.
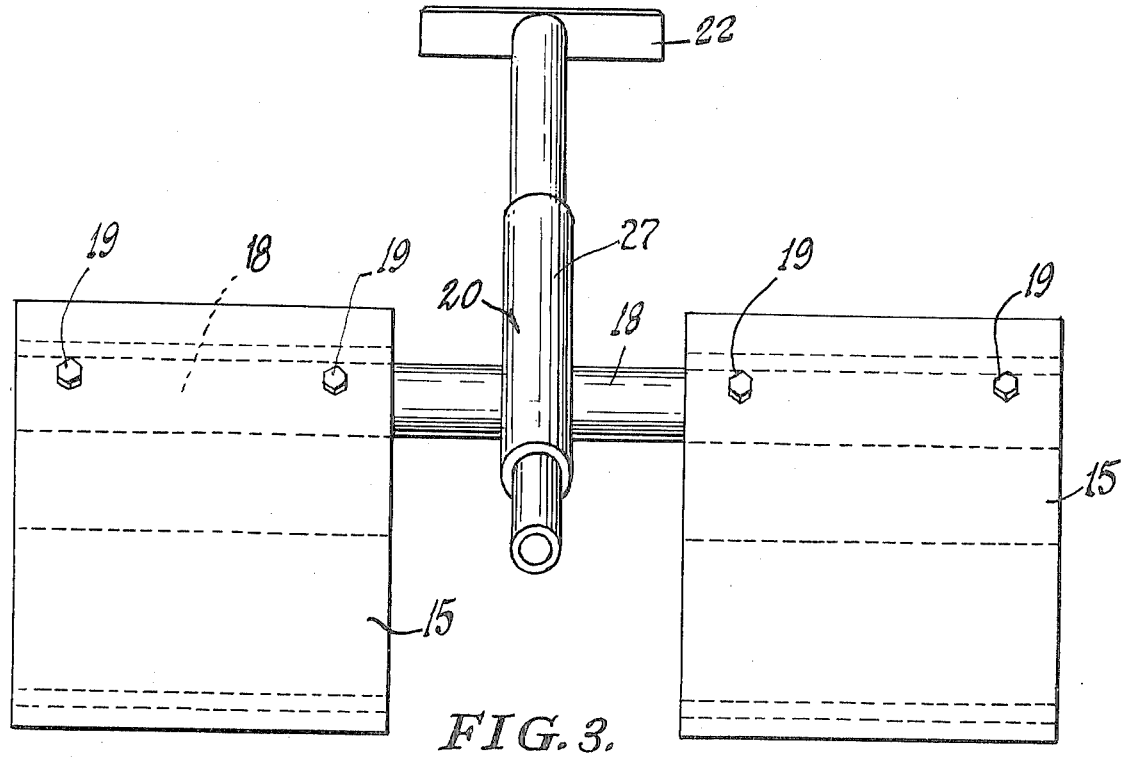
FIG. 3.

4,399,893

LOCKING WHEEL BLOCK

SUMMARY OF THE INVENTION

It is a principal object of this invention to provide a wheel block having an adjustable locking member adapted to engage the inner surface of a tire rim when the wheel is in contact with a blocking ramp so as to prevent unwanted movement of the vehicle.

The invention consists of a wheel block for use upon dual wheeled vehicles, and, as such, provides a pair of wheel blocking ramps of identical configuration mounted in a fixed spaced relation. A single blocking arm is carried by the wheel block and extends angularly with respect to the ramps in a rearwardly and radially relation to the wheels of the vehicle when the tires of such wheels have a portion of their periphery resting in facial abutment upon the ramps. The locking arm is rotatably and longitudinally adjusted throughout its length relative to the fixed position of the ramps and provides a cross arm adapted to be located behind the rim of the wheels when the same are positioned on the ramp so as to releasably connect the wheel block to the wheels to prevent unwanted movement of the same.

The locking wheel block of this invention is highly efficient in use, and readily adaptable to vehicles having wheel diameters of varying size. The blocks are positive in preventing unwanted movement of the wheels when they are once mounted and locked upon the vehicle wheels.

The wheel block of this invention is simple in construction and economical in manufacturing and highly efficient in use. It is highly versatile in that it is adjustable so as to be readily adaptable to dual wheel assemblies of varying diameters.

Other objects of the invention will appear and be described hereinafter.

GENERAL DESCRIPTION OF THE DRAWINGS

The invention will be best understood by reference to the accompanying drawings which show the preferred form of embodiment by which the objects of the invention are achieved, and, in which:

FIG. 1 is a perspective view of the locking wheel block;

FIG. 2 is a side elevational view of the locking wheel block of this invention; and FIG. 3 is a front elevational view of the wheel block of this invention.

GENERAL DESCRIPTION OF THE INVENTION

With the advent of multi-wheeled vehicles, including detachable trailer units, it is advantageous to provide a wheel block, or chock, which will prevent accidental, undesired, or dangerous movement of the vehicle once it has been stopped or disconnected during periods of storage, loading, and unloading. It is the object of this invention to provide a locking wheel block which may be easily connected and locked to the wheels of such a vehicle that will prevent any unauthorized movement.

The locking wheel block 10 of this invention comprises a pair of base members 11 and 12 providing arcuated ramp segments of similar configuration. The configuration of each of the base members includes a base 13 and a plurality of ground engaging feet 14. Extending angularly from the base 13, and as an extension of one of the feet 14, is an angularly disposed substantially flat front wall 15. Connecting the upper extremity of the front wall 15 to the opposite extreme foot 14 is an arcuated ramp forming member 16. Extending between the ramp forming member 16 and the base 13, and in an angular position with respect to the mid foot 14, is a supporting brace 17. This description applies to each of the wheel engaging base members 11 and 12, as clearly illustrated in FIGS. 1 and 2.

The base members 11 and 12 are connected together in a horizontal aligned spaced apart relation by a support member 18. As clearly shown in the drawings, this support member 18 consists of a hollow rod-like element and is disposed near the upper juncture of the front wall 15 and the ramp forming arcuated member 16. A series of connectors 19 in the form of nuts and bolts attaches the support member 18 to each of the base members 11 and 12.

Secured upon the support member 18 between the base members 11 and 12 is a receiving sleeve 20. This sleeve 20 may be welded to the support member 18 in a manner so that it extends tangentially with respect thereto and extends in a radial direction with respect to the curvature of the ramp forming arcuated member 16.

Adapted to be slidably journalled within the sleeve 20 is an elongated arm 21. At the uppermost end of the arm 21 there is provided a locking cross brace 22 which extends perpendicular to the elongated arm 21, as clearly seen in FIGS. 1 and 3. The opposite end of the arm 21 is provided with a series of apertures 23 which extend in a parallel direction to the cross brace 22 through the arm 21.

The corresponding end of the sleeve 20 is provided with a singular opening 24 which is adapted to be aligned with any selective aperture 23 formed in the arm 21 and through which a locking pin, not shown, is adapted to be projected so as to lock the arm 21 in a selective position with respect to the sleeve 20. By this arrangement, the locking cross brace 22 can be secured in varying distances with respect to the peripheral arc of the ramp forming arcuated member 16.

It should be noted that when the arm 21 is not secured to the sleeve 20 it is free to be rotated about its longitudinal axis. This rotation will place the locking cross brace 22 either in a vertical position wherein it extends normal to the plane of the arm 21, or in a substantially horizontal position where it extends in a spaced relation to the arcuated faces of the ramp forming arcuated member 16.

In use, the locking wheel block, with the locking brace 22 rotated in its vertical position with respect to the long axis of the arm 21, is positioned against the dual wheels of a vehicle, with the tires' peripheral edge in facial abutment with the ramp forming arcuated members 16 of each of the base members 11 and 12. The arm 21 is then rotated through approximately 90° so as to dispose the locking cross brace 22 in a horizontal position. The arm 21 is then moved longitudinally through the sleeve 20 until the locking cross brace 22 is in physical contact with the inner surface of the rims of the dual wheeled vehicle. In such selected position the opening 24 will be aligned with a selective aperture 23 formed in the arm 21, and a suitable pin will be journalled therethrough so as to lock the arm 21 relative to the sleeve 20 and the base members 11 and 12 onto the dual wheels of the vehicle.

The longitudinal adjustability of the arm 21 permits this device to be used on vehicles having wheels of varying diameters. It should be noted that when reference has been made to vehicle wheels such reference includes not only the tires, but the rims upon which they are mounted, and as such the ramp elements of this invention are readily adaptable to the total dimensions of various wheel designs.

The rotational feature of the locking cross brace 22 and the longitudinal adjustment of the arm 21, while simple in construction and highly efficient in use, are new and novel in dual wheel locking blocks.

As illustrated in the drawings the surfaces of the ramp forming members 16 may be ribbed, as at 25, so as to provide greater traction between it and the confronting tire face.

It has been found in some circumstances, when there is a differentional between the circumferences of the wheel and the arc of the wheel block, that the block 10 can be lifted following the contour of the wheel, until the space therebetween allows the block 10, as well as the cross brace 22, to be turned, so that the brace 22 can be removed from between the wheels.

To prevent this occurance there is provided an anti rotation plate 26. As seen in the drawings the plate 26 is a flat rectangularly shaped piece extending radially from the upper end 27 of the sleeve 20. The plate 26 extends in a angular direction between the members 16, and will be disposed perpendicularly to the cross brace 22, when the latter is in its locking position.

While I have illustrated and described the preferred form of construction for carrying my invention into effect, this is capable of variation and modification without departing from the spirit of the invention. I, therefor, do not wish to be limited to the precise details of construction as set forth, but desire to avail myself of such variations and modifications as come within the scope of the appended claims.

Having thus described the invention what I claim as new and desire to protect by Letters Patent is:

1. A lockable wheel block adapted to be releasably connected between the rims and tires of a dual wheeled vehicle so as to prevent movement of the wheels in either direction comprising:
   (a) a pair of base members each providing spaced apart curved ramp faces having inner and outer surfaces, said outer surfaces being adapted to engage the circumferential periphery of the tires,
   (b) a horizontal support extending between and fixedly connecting said base members together with said ramp faces in side-by-side spaced apart relation,
   (c) an elongated restraining arm mounted upon said support between said base members and extending in a raised radial direction with respect to said ramp faces,
   (d) mounting means on said support through which said arm is rotatable and longitudinally movable through a raised radial path with respect to said ramp faces,
   (e) means for releasably connecting said restraining arm to said support at preselected positions throughout its length and in a non-rotatable condition, and
   (f) a rim engaging member carried at one end of said restraining arm and rotatable and movable therewith to a position between and behind the rims of the wheeled vehicle when the tires mounted upon the rims are in facial contact with said ramp faces and further rotatable and movable as required to bring said rim engaging member into rim engagement to attach said wheel blocks thereto and to prevent movement of the wheels in either direction.

2. A lockable wheel block as defined by claim 1, wherein said support comprises an elongated tubular member fixedly attached to the inner surfaces of said ramp faces so as to mount said base members in a spaced apart relation with said ramp faces aligned in juxtaposed positions.

3. A lockable wheel block as defined by claim 1, wherein said means for mounting said restraining arm to said support comprises a hollow sleeve mounted on said support equidistant between said base members and having its longitudinal axis extending in a radial direction with respect to said ramp faces.

4. A lockable wheel block as defined by claim 1, wherein said rim engaging member carried at one end of said restraining arm and adapted to be rotated and moved therewith to a position behind the rims of a wheeled vehicle comprises a cross brace mounted at said one end of said arm with said cross brace being of a sufficient length so as to be positioned behind the rims of the wheels of the vehicle when the tires thereof are mounted upon said ramp faces so as to capture between said cross brace and said ramp faces the rims and wheels of the vehicle so as to prevent movement of the wheel.

5. A lockable wheel block as defined by claim 4, wherein said support comprises an elongated tubular member fixedly attached to the inner surfaces of said ramp faces so as to mount said base members in a spaced apart relation with said ramp faces aligned in juxtaposed positions.

6. A lockable wheel block as defined by claim 4, wherein said means for mounting said restraining arm to said support comprises a hollow sleeve mounted on said support equidistant between said base members and having its longitudinal axis extending in a radial direction with respect to said ramp faces.

* * * * *